US008943223B2

(12) United States Patent
Tang

(10) Patent No.: US 8,943,223 B2
(45) Date of Patent: Jan. 27, 2015

(54) ADAPTIVE SESSION COMPRESSION MANAGEMENT METHOD, COMPRESSION MANAGER AND SESSION MANAGEMENT SYSTEM

(75) Inventor: Feng Wei Tang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 580 days.

(21) Appl. No.: 11/996,485

(22) PCT Filed: Jun. 29, 2006

(86) PCT No.: PCT/EP2006/063707
§ 371 (c)(1),
(2), (4) Date: Mar. 11, 2008

(87) PCT Pub. No.: WO2007/009865
PCT Pub. Date: Jan. 25, 2007

(65) Prior Publication Data
US 2008/0209073 A1 Aug. 28, 2008

(30) Foreign Application Priority Data

Jul. 22, 2005 (CN) .......................... 2005 1 0085305

(51) Int. Cl.
G06F 15/16 (2006.01)
H04L 29/06 (2006.01)
H04L 29/08 (2006.01)
(52) U.S. Cl.
CPC ................ H04L 69/04 (2013.01); H04L 67/02 (2013.01); H04L 67/142 (2013.01)
USPC ....................................................... 709/247
(58) Field of Classification Search
USPC ....................................................... 709/247
See application file for complete search history.

(56) References Cited

U.S. PATENT DOCUMENTS 6,751,209 B1 * 6/2004 Hamiti et al. ................. 370/349
6,832,380 B1 12/2004 Lau et al.
2002/0073298 A1 6/2002 Geiger et al.

FOREIGN PATENT DOCUMENTS

JP 2003141068 A 5/2003

OTHER PUBLICATIONS

"What is granularity?" Definition from WhatIs.com, Apr. 5, 2005.*
"Technology of Managing Sessions in E-Commerce System," Ren Bo, Dec. 31, 2004, pp. 62-65.

* cited by examiner

Primary Examiner — Kenny Lin
(74) Attorney, Agent, or Firm — Novak Druce Connolly Bove + Quigg LLP

(57) ABSTRACT

The invention provides an adaptive session compression management method and a compression manager in an application server, the compression management method comprising: acquiring the session state information indicated as needing to be saved from the session manager in the application server; determining whether to compress the session state information according the session state information itself and the configuration information related to the conditions of system resources; in case that the session state information needs to be compressed, determining the optimal compressor and the optimal compression method according to the conditions of the system resources in the application server, to compress the session state information; and storing the session state information at a specified location in the session manager, and in case that the session state information is compressed, storing the type information of a corresponding compressor together with the session state information. The invention determines appropriate time and appropriate method to compress the session state information, and can greatly enhance the performance and capability of the application server.

16 Claims, 4 Drawing Sheets

ADAPTIVE SESSION COMPRESSION MANAGEMENT METHOD, COMPRESSION MANAGER AND SESSION MANAGEMENT SYSTEM

CROSS-REFERENCE TO RELATED APPLICATIONS

This application is a §371 national stage entry of International Application No. PCT/EP2006/063707, filed Jun. 29, 2006, which claims priority to Chinese Application 200510085305.8, filed Jul. 22, 2005.

TECHNICAL FIELD

The present invention relates to the session management in an application server, and in particular to an adaptive session compression technique in the application server.

BACKGROUND OF THE INVENTION

Various application servers have emerged as a result of the development of computer networks. From a historical view point, Web application servers evolved from various middleware products and techniques. A Web application server (or application server for short) is a distributed middleware software implementation product, and functions as an interface that connects with various kinds of clients on one end and various kinds of back-end system resources on the other end. It is in charge of managing clients' requests, providing a host environment for business logics, connecting with data, transaction, directory and other back-end computing resources. In general, the HTTP protocol is used to transmit data between clients and the application server. The HTTP protocol is a stateless protocol; that is, the application server treats every access to a page as unrelated to one another, and does not retain any information about the previous access, even if this access occurred just a few seconds ago. Therefore, the application server does not know any information about the previous accesses from the same client.

Accordingly, to remedy this drawback of the HTTP protocol, a session manager is typically used in the application server to manage all session state information. The session manager, like a Hashtable, produces a unique identifier, referred to as a session ID, for every new session, and uses these session IDs as the keys for saving all the session state information. During a client's access to the application server, the session manager will maintain the session state information. At the same time, the session ID will also be saved in the client's browser in the form of a cookie.

Session state information may typically be saved in the memory, files or a database of the application server, hence there are three session management mechanisms: memory-based session management, file-based session management, and database-based session management.

The memory-based session management is a mechanism with the fastest operation speed, and typically allocates a shared memory region in the memory of the application server specially where session state information can be accessed quickly. This mechanism poses high requirements on the system configurations of the application server, the system resources being required to bear high access traffic, otherwise, not only the access speed can not be increased, but contrarily the server would be overloaded due to the insufficiency of system resources.

The file-based session management is the most widely-used mechanism, in which session state information is typically stored in the hard disk of the application server in the form of text files. This mechanism is readily implemented, and the requirement on the system configuration of the server is not high, but the files storing session state information lack logic relations between them, and when concurrent access traffic is large, the number of the session management files will increase rapidly, not only greatly increasing the difficulty in designing the session management mechanism, but also accordingly impacting on the speed of accessing the session information.

The database-based session management is a mechanism that can be most easily extended, and requires the application server to have the support of a network database system, wherein session state information is all stored in the network database, and under the support of the database system, the session management can leverage fully the transaction processing, secure access, data integrity check and other mechanisms of the database to manage all session state information efficiently.

The adoption of the session management technique not only solves the problem of accessing session state information, but also greatly facilitates the development of applications for applications servers.

But, whichever session management mechanism is used, when users need to establish many or large session objects, a large amount of memory space of the application server often is occupied. And especially in a session affinity and persistence enabled or heavy-load environment, the performance and capability of the application server can be greatly decreased. Large objects' serialization/de-serialization and I/O will become a bottleneck of the application server.

Therefore, there is a need for a technique that can effectively ease the burden of users' session state information on the system.

SUMMARY OF THE INVENTION

To solve the above problem, the present invention presents an adaptive session compression management method and compression manager, which automatically select the optimal compressor and compression method according to the size of session state information needing to be saved and the conditions of system resources (e.g., central processing unit (CPU) and memory), to adaptively compress the user's session state information, thus enhancing the performance of the application server.

According to an aspect of the present invention, there is provided an adaptive session compression manager in an application server. The adaptive session compression manager can include: a compression determining component for determining whether session state information needs to be compressed according to the session state information itself and the configuration information related to the conditions of system resources; a compression method determining component for determining the optimal compressor and compression method according to the conditions of the system resources of the application server in case that the session state information needs to be compressed, and for notifying a corresponding compressor; and at least one compressor for compressing the session state information according to the instructions from the compression method determining component.

According to another aspect of the present invention, there is provided an adaptive session compression management method in an application server. The method can include: acquiring the session state information indicated as needing to be saved from the session manager in the application server; determining whether the session state information is to be compressed according the session state information itself and the configuration information related to the conditions of system resources; determining the optimal compressor and the optimal compression method according to the conditions of the system resources in the application server in case that the session state information needs to be compressed, to compress the session state information; and storing the session state information at a specified location in the session manager, and in case that the session state information is compressed, storing the type information of the corresponding compressor together with the session state information.

According to yet another aspect of the present invention, there is provided an adaptive session management system. The adaptive session management system can include: a session manager for managing and maintaining the session state information of users and applications; a session state information presentation component for transferring users' session state information between the session manager and applications; an interface unit by which users or the system administrator of the application server set configuration information in a configuration file; and an adaptive session compression manager in the application server mentioned above.

Among the various advantages provided by the present invention consist are:

1. The adaptive session compression in an application server according to the present invention can enhance the system performance when there are large objects in session information. Since a Java (Java and all Java-based trademarks are trademarks of Sun Microsystems, Inc. in the United States, other countries, or both) program will spend a great amount of time in the serialization and de-serialization of large objects, the compression of the larger objects will greatly reduce this time, thus enhancing the system performance.

2. The adaptive session compression in an application server according to the present invention can increase the number of users that can be held in the application server. Through more efficient use of the system resources, the CPU, memory and other resources can be loaded relatively evenly, thus increasing the system capacity.

3. The adaptive session compression in an application server according to the present invention can increase the fault tolerance of the system through the compression and management of session information.

BRIEF DESCRIPTION OF THE DRAWINGS

It is believed that the above features, advantages and objects of the present invention would be better understood through reading the following description of the specific implementation of the present invention in conjunction with the accompanying drawings.

DETAILED DESCRIPTION OF PREFERRED EMBODIMENTS

Figure 1:
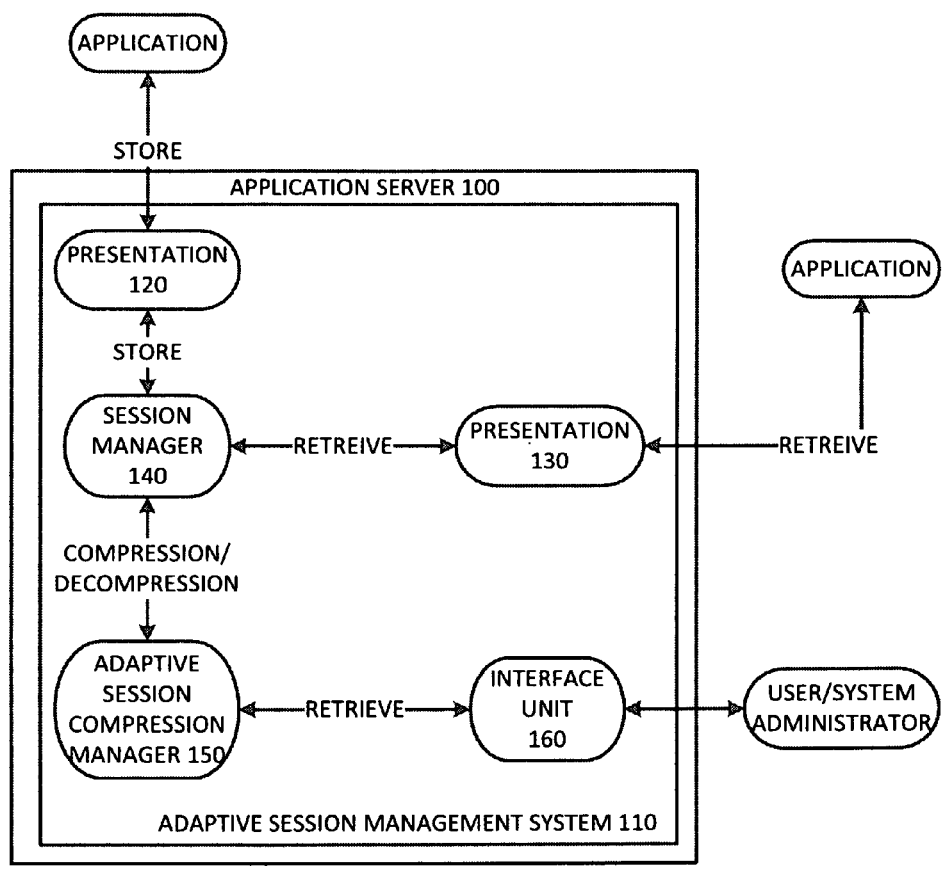
FIG. 1 is a schematic diagram of an adaptive session management system according to an embodiment of the present invention.

Initially, the session management mechanism is described in brief, exemplified by the session management mechanism of Servlet as follows.

As mentioned above, the HTTP protocol is a stateless protocol, which means that the Web application does not know the information about the previous requests of the same user. One of the methods of maintaining the session information is to use the session tracking function provided by Servelet or JSP containers. The Servelet API specification defines a simple HttpSession interface, through which session tracking can be realized conveniently.

The HttpSession interface provides the methods of storing and returning standard session attributes. The standard session attributes, such as a session identifier, application data, etc. are stored in the form of "name-value" pairs. Briefly, the HttpSession interface provides a standard method for saving objects in the memory, and retrieving these objects during subsequent requests of the same user. The method for saving data in a session is setAttribute(String s, Object o), and the method for retrieving an previously saved object from a session is getAttribute(String s).

To acquire the HttpSession object, the getSession method of the HttpServletRequest object can be invoked. To maintain the session state properly, the getSession method must be invoked prior to sending any reply content.

Whenever a new user requests a JSP page that uses the HttpSession object, the JSP container, apart from sending back the reply page, will send a special number to the browser as well. This special number is called a "session identifier", and is a unique user identifier. Thereafter, the HttpSession object resides in the memory, and waits for the same user to re-invoke its methods when coming back.

At the client side, the browser saves the session identifier, and sends this session identifier to the server in every subsequent request. The session identifier tells the JSP container that the current request is not the first request sent by the user, and the server has previously established a HttpSession object for this user. This time, the JSP container will not establish a new HttpSession object for the user any more, but instead find the HttpSession object with the same session identifier, and then establish the association between the HttpSession object and the current request.

The session identifier is transferred between the server and the browser in the form of a cookie. If the browser does not support cookies, the subsequent requests of the user to the server will not carry a session identifier. Consequently, the JSP container will consider that the request comes from a new user, and establish an HttpSession object once again, while the previously established HttpSession object still resides in the memory, but the previous session information of the user will be lost.

In the HTTP protocol, when a user is no longer active, no explicit termination signal is present. For this reason, the application server does not know whether the user will come back again, and if no method is adopted to solve this problem, there will be a large number of HttpSession objects accumulated in the memory.

Therefore, a user session may be invalidated both manually and automatically. To invalidate a session means to remove the HttpSession object and its data from the memory. For example, if in a certain period of time (30 minutes as default) the user does not send a request again, the Java Web Server automatically invalidates the session of the user.

The Servlet/JSP session tracking mechanism has some limitation, that is, session objects are stored in the memory of the application server, occupying substantial resources.

One aspect of the invention is to enhance the session management system in an application server to enable it to automatically select the optimal compressor and compression method according to the size of the session state information that needs to be saved and the conditions of system resources (e.g., CPU or memory) to adaptively compress the session state information, in order to achieve the objectives of enhancing the performance of the session management system, increasing the number of sessions that the application server can hold, and enhancing the fault tolerance of the system.

The preferred embodiments of the present invention are described herein in detail with reference to the accompanying drawings.

According to an aspect of the present invention, there is provided an adaptive session management system. The system is n now described below in detail with reference to the accompanying drawings.

FIG. 1 is a schematic diagram of an adaptive session management system according to an embodiment of the present invention. The adaptive session management system according to the present embodiment adaptively manages and maintains the session state information in an application server 100.

As shown in FIG. 1, the adaptive session management system 110 of the present embodiment resides in the application server 100, and comprises session state information presentation components 120 and 130, a session manager 140, an adaptive session compression manager 150, and an interface unit 160.

The session state information presentation component 120 is used for acquiring the session state information in the interaction between a user and an application, and transferring this information to the session manager 140 through the interface with the session manager, in order to manage and maintain the session state information in the session manager 140.

The session state information presentation component 130 is used for receiving a request to retrieve session state information maintained in the session manager, retrieving the corresponding session state information from the session manager 140 according to the request through the interface with the session manager 140, and presenting the session state information to the application after the adaptive decompression by the adaptive session compression manager 150.

The session manager 140 is used for storing and maintaining session state information. In the session manager 140, session state information is preferably maintained as session state objects indexed by session IDs. In the session manager 140, any one of the memory-based session management mechanism, the file-based session management mechanism, and the database-based session management mechanism can be used. In the present embodiment, any kind of conventional session managers can be used as the session manager 140. The session manager 140, upon receiving the session state information of a newly-established session from an application or the session state information of an already-established session updated by an application, first transfers the session state information to the adaptive session compression manager 150, indicating at the same time that the session state information is newly-established or updated that needs to be saved, in order to adaptively compress it, and then saves the compressed session state information to a specified location. Besides, when a certain application requests the session manager 140 to read out existing session state information, the session manager 140 retrieves the requested existing session state information from a specified location, and transfers it to the adaptive session compression manager 150, indicating at the same time that the session state information is the session state information that needs to be presented to the application, in order to adaptively decompress it, and then presents it to the application through the session state information presentation component 130. The session manger 140 and the adaptive session compression manager 150 transfer session state information and other related information with each other through an interface.

The adaptive session compression manager 150, on the one hand, is used for automatically selecting the optimal compressor and compression mode according to the size of the session state information needing to be saved and the conditions of system resources (e.g., CPU or memory) to adaptively compress the session state information indicated as needing to be saved from the session manager 140, and transferring the compressed session state information together with the type information of the compressor used to the session manager 140 in order to be saved. On the other hand, it is used for determining whether the existing session state information indicated to be presented to an application from the session manager 140 needs to be decompressed, and in case that it needs to be decompressed, decompressing it with the corresponding decompressor according to the type information of the compressor stored together with the session state info nation, and returning the decompressed session state information to the session manager 140 in order to be presented to the application requesting the information.

Users or the system administrator of the application server set the compression thresholds, compressors, compression methods and other configuration information in a configuration file through the interface unit 160.

Figure 2:
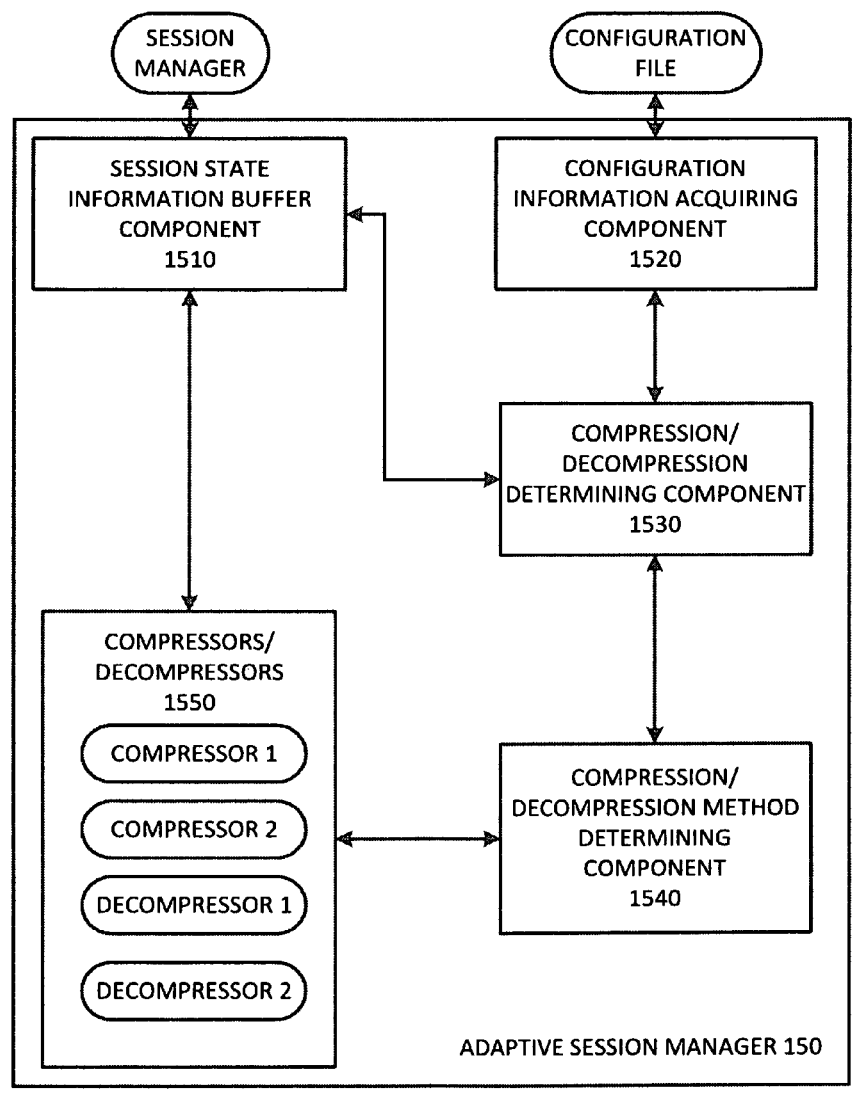
FIG. 2 is a block diagram of an adaptive session compression manager in an application server according to an embodiment of the present invention.

FIG. 2 is a block diagram of an adaptive session compression manager in an application server according to an embodiment of the present invention.

As shown in the figure, the adaptive session compression manager 150 comprises a session state information buffer component 1510, a configuration information acquiring component 1520, a compression/decompression determining component 1530, a compression/decompression method determining component 1540, and compressors/decompressors 1550.

The session state information buffer component 1510 is used for buffering the session state information newly-established or updated and indicated as needing to be saved from the session manager of the application server, or the session state information read from a specified location by the session manager and indicated to be presented to the application requesting this information, to be adaptively compressed/decompressed by the adaptive session compression manager. Between the session state information buffer component 1510 and the session manager 140 is an interface for transferring session state information and the related information.

The configuration information acquiring component 1520 is used for acquiring the configuration information set by users or the system administrator of the application server from a configuration file, such as compression thresholds, compressors and compression methods. The following is an example of the configuration file:

```
[threshold] //When the size of the session state information exceeds
this value, e.g. 500k, the compression begins.
    Size=500,000
    [compressor] // The user can here specify the compressors intended
    to be used.
        Zip=Zipcompressor
        Rar=Rarcompressor...
    [CPU] // The user can here specify the relationship between the
utilizations of the CPU and the corresponding compression methods, such
as maximum, no compression etc., the numbers denoting the percentages.
        20=Best
        50=Normal
        70=Fast
        80=None
    [Memory] //The user can here specify the relationship between the
utilizations of the memory and the compression methods, the numbers
denoting the percentages.
        20=Fast
        50=Normal
        70=Best
        ...
```

In the present embodiment, on the one hand, the compression/decompression determining component 1530 compares the size of the session state information in the session state information buffer component 1510 indicated as needing to be saved in the session manager 140 and the compression threshold in the configuration file, to determine whether to compress the session state information. When the size of the session state information exceeds the threshold, it notifies the compression method determining component 1540 to select the optimal compression method. On the other hand, the compression/decompression determining component 1530 determines whether the existing session state information in the session state information buffer component 1510 indicated as needing to be presented to the application requesting this information has been compressed. If the information has been compressed, it notifies this fact to the compression/decompression determining component 1540.

The compression/decompression method determining component 1540, on the one hand, according to the instructions from the compression/decompression determining component 1530, selects the optimal compressor and optimal compression method based on the compressor intended to be used and the requirements on the compression method set in the configuration file, as well as the conditions of the system resources of the application server, and notifies this optimal compressor in the compressors/decompressors 1550 to compress the session state information in the session state information buffer component 1510 indicated as needing to be compressed. On the other hand, according to the instructions from the compression/decompression determining component 1530, the compression/decompression method determining component 1540 acquires the type information of the compressor stored together with the session state information in the session state information buffer component 1510 currently indicated as needing to be decompressed, determines the decompressor corresponding to the compressor, and notifies this corresponding decompressor in the compression/decompression 1550 to decompress the session state information. In the present embodiment, the decompressors corresponding to the above compressors are a Zipdecompressor and a Rardecompressor.

It is noted that, in the present invention, even if the compression/decompression determining component 1530 has determined that the session state information should be compressed according to the size of the session state information and the compression threshold in the configuration file, the compression/decompression method determining component 1540 may still decide not to compress according to the conditions of the system resources of the application server. For example, when the utilization of the CPU exceeds 80%, the optimal compressor and optimal compression method selected by the compression/decompression method determining component 1540 would be "None," namely, no compression. In this case, the compression/decompression method determining component 1540 would not activate any compressor/decompressor, and the session state information buffer component 1510 would return the original session state information to the session manager 140.

The compressor/decompressor in the compressors/decompressors 1550 as determined by the compression/decompression method determining component 1540 compresses/decompresses the session state information in the session state information buffer component 1510 with the determined optimal compression/decompression method under the instructions from the compression/decompression method determining component 1540. In the case of compression, the type information of the corresponding compressor is stored in the session state information buffer component 1510 together with the compressed session state information. And the session state information buffer component 1510 returns the compressed session state information together with the type information of the compressor to the session manager 140. In the case of decompression, the decompressor that decompressed the specified session state information stores the decompressed information in the session state information buffer component 1510, and then the session manager 140 presents it to the requesting application through the session state information presentation component 130.

It needs to be noted that, in case that the compression/decompression determining component 1530 determines that the session state information indicated to be saved in the session manager 140 needs no compression, the session state information buffer component 1510 returns the information directly to the session manager 140. Besides, in case that the session state information indicated to be presented to the application needs no decompression, the adaptive session compression manager 150 can returns the information directly to the requesting application through the session state information presentation component 130.

It needs also to be noted that, although in the above embodiment the components related to decompression are incorporated in the adaptive session compression manager 150, it is evident to those ordinary skilled in the art that these components related to decompression can also be separate from the adaptive session compression manager 150, and integrated into a separate component.

Figure 3:
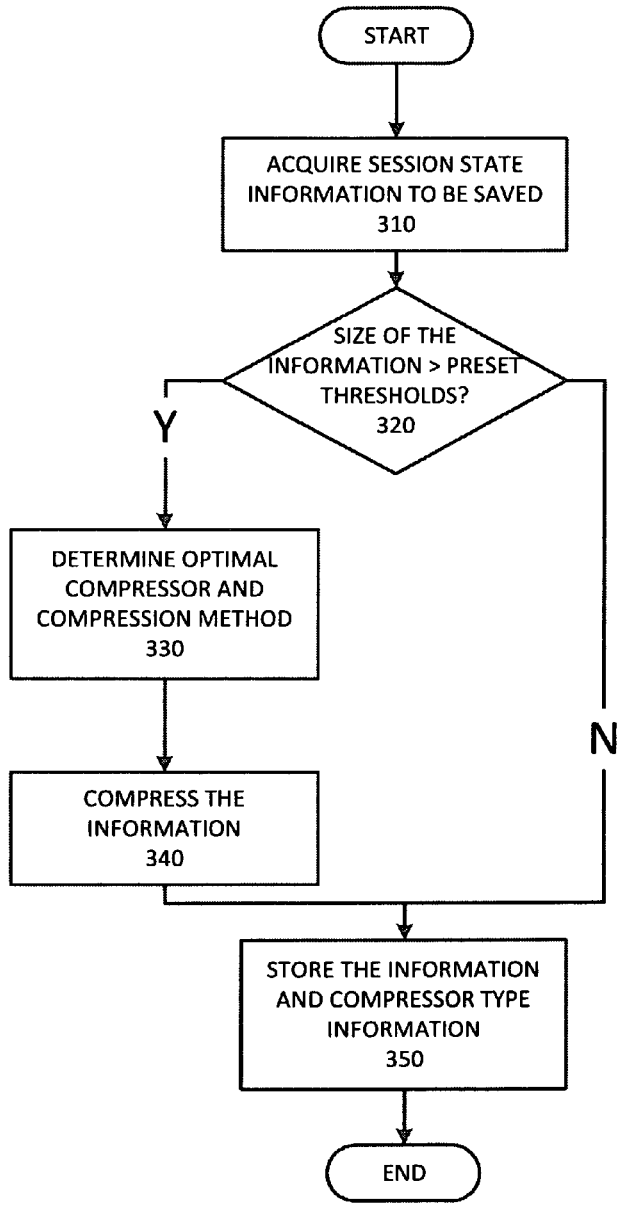
FIG. 3 is a flowchart of the compression process in an adaptive session compression management method in an application server according to an embodiment of the present invention.

According to another aspect of the present invention, there is provided an adaptive session compression management method in an application server. This method comprises two particular aspects: one aspect is the adaptive compression process performed on the session state information newly-established or updated and needing to be saved in the session manager, the other aspect is the adaptive decompression process performed on the session state information read out by the session manager from a specified location and needing to be presented to the requesting application. FIG. 3 is a flow chart of the compression process in the adaptive session compression management method in an application server according to an embodiment of the present invention.

As shown in the figure, at step 310, the session state information indicated as newly-established or updated and needing to be saved from the session manager of the application server is acquired.

At step 320, it is determined whether the size of the session state information exceeds the preset compression threshold, wherein the threshold is set in a configuration file by a user or the system administrator of the application server. This configuration file is as that described above. At this step, if the size of the session state information exceeds the compression threshold in the configuration file, the process proceeds to step 330, otherwise, the process proceeds to step 350.

At step 330, the optimal compressor and the optimal compression method is determined according to the compressor intended to be used and the requirements on the compression method set in the configuration file and according to the conditions of the system resources of the application server.

Next, at step 340, the session state information is compressed using the optimal compressor and compression method as determined at the previous step.

Next, at step 350, the session state information together with the type information of the compressor is stored in the session manager. If the information is not compressed, the session state information is stored directly without the type information of the compressor.

The session state information is stored in a specified location of the session manager, and in case that the session state information is compressed, the type information of the corresponding compressor is stored together with the session state information.

For the above process, the setAttribute (java.lang.String, java.lang.Object) function of the public interface HttpSession of the application server can be used to treat the session state information as a session state object, in order to realize the user-customized saving of the session state information. The following is a specific code implementation thereof:

```
public class xHttpSession {
    //the session state object to be saved
    HttpSession session=null;
    // adaptive session compression manager
    AdaptiveSessionManager asm =
            AdaptiveSessionManager.getInstance( );
    // constructing function
    public xHttpSession (HttpSession session) {
        this.session=session;
    }
    // save the session information
    public setAttribute (String key, object value) {
        // check whether compression is needed
        if ( asm.check (value)==true) {
            // if compression is needed, the adaptive session compression
                // manager selects an appropriate compressor to compress,
                // and places the compressed value into the original session
                // manager
            object newValue=asm.getCompressor( ).compress (value);
            session.setAttribute (key, newValue);
        }
    }
}
```

Figure 4:
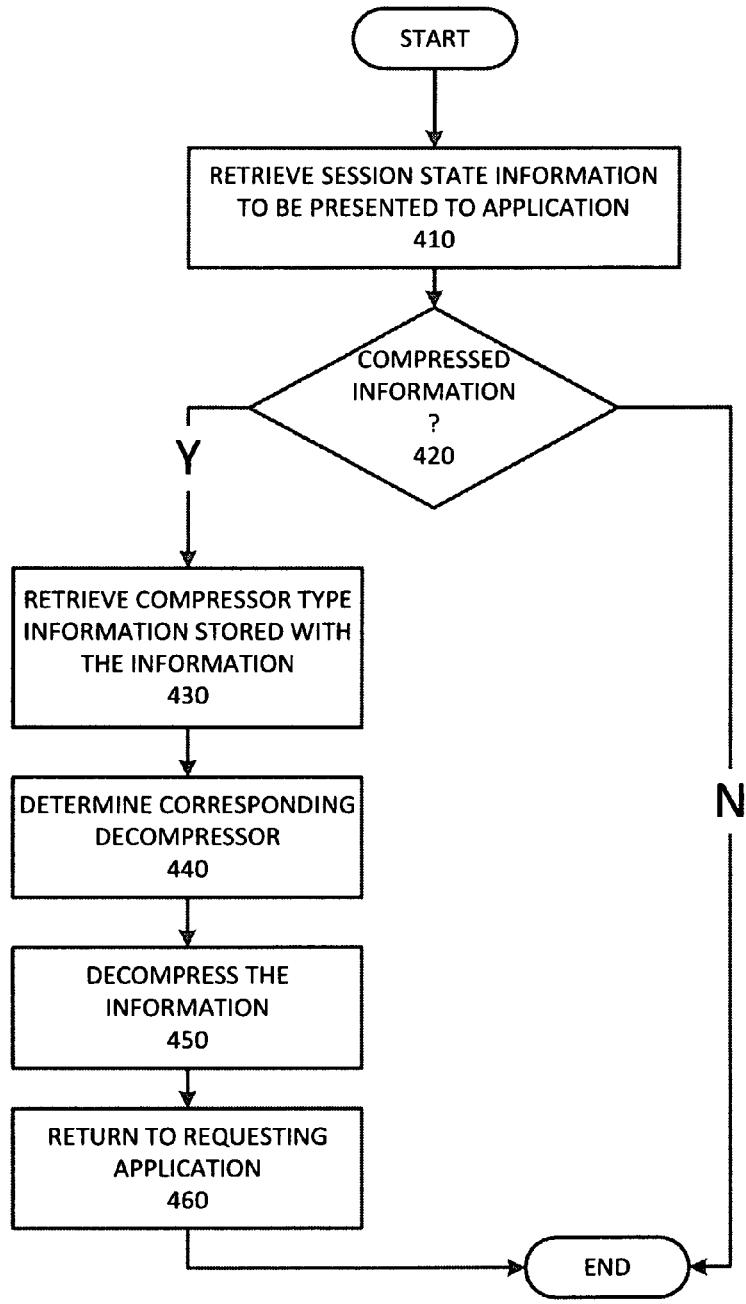
FIG. 4 is a flowchart of the decompression process in an adaptive session compression management method in an application server according to an embodiment of the present invention.

Accordingly, when the session state information that has been adaptively compressed through the above compression process needs to be presented again, it needs to be decompressed. Therefore, in the adaptive session compression management method in an application server of the present invention there is also a corresponding adaptive decompression process, which performs on the session state information that has gone through the above adaptive compression process. FIG. 4 is a flow chart of the decompression process in the adaptive session compression management method in an application server according to an embodiment of the present invention.

As shown in the figure, at step 410, the session state information retrieved from a specified location by the session manager and indicated to be presented to the requesting application is acquired.

At step 420, it is determined whether the session state information has been compressed. If the information has been compressed, the process proceeds to step 430, otherwise, the process ends.

At step 430, the type information of the compressor stored together with the session state information in the session manager is retrieved.

At step 440, the corresponding decompressor is determined according to the type information of the compressor retrieved at step 430.

At step 450, the session state information is decompressed using the decompressor determined at step 440.

At step 460, the decompressed session state information is returned to the application requesting the session state information through the presentation logic of the application server.

For the above method, the getAttribute (java.lang.String) function of the public interface HttpSession of the application server can be used to realize the user-customized retrieval of the session state information. The following is a specific code implementation thereof:

```
// read the session state object
public Object getAttribute (String key) {
    // retrieve the value through the system session manager
    Object value=session.getAttribute (key) ;
    // check whether the value has been compressed
    if (asm.isCompressed (value) ) {
        value=asm.uncompress (value) ;
    }
    return value;
}
```

The adaptive session compression management method, compression manager and session management system in an application server of the invention have been described hereinabove with reference to the embodiments. It should be noted that these embodiments are only examples, and those skilled in the art can make various modifications based thereon.

The invention claimed is:

1. An adaptive session compression manager in an application server, comprising:
a session state information buffer component for buffering session state information from a session manager of the application server when the session state information is indicated as needing to be saved, wherein the session state information is transferred from the session manager to the session state information buffer component through an interface between the session manager and the session state information buffer component;
a configuration information acquiring component for acquiring configuration information set by a user or system administrator of the application server from a configuration file, the configuration information comprising compression thresholds, compressors, compression methods for the compressors as a function of CPU utilization, and compression methods for the compressors as a function of memory utilization, the compression methods comprising best compression, normal compression, fast compression, and no compression methods;

a compression determining component for determining whether the session state information in the session state information buffer component needs to be compressed according to a size of the session state information and the configuration information related to the compression thresholds;

a compression method determining component for determining a one of the compressors and selecting a one of the compression methods according to the conditions of at least the memory and the CPU of the application server in case that the session state information needs to be compressed, and instructing the determined compressor to compress the session state information according to the selected compression method in the case that the selected compression method is not the no compression method, wherein the compression method determining component is configured for performing the selecting of the one of the compression methods by identifying a first of the compression methods by comparing an amount of the CPU utilization to a first plurality of thresholds corresponding to each the compression methods, identifying a second of the compression methods by comparing an amount of the memory utilization to a second plurality of thresholds corresponding to each the compression methods, and determining the one of the compression methods to be a one of the first and the second compression methods providing a lowest compression performance.

2. The adaptive session compression manager according to claim 1, wherein said compression thresholds comprise a threshold on the size of session state information.

3. The adaptive session compression manager according to claim 1, further comprising:
a decompression determining component for acquiring session state information indicated to be presented to an application from said session manager, determining whether the acquired session state information has been compressed, and in case that the acquired session state information has been compressed, notifying a corresponding decompressor; and
at least one of decompressor for decompressing the session state information.

4. The system of claim 1, wherein the first and the second plurality of thresholds are the same.

5. The system of claim 1, wherein the first and the second plurality of thresholds are the different.

6. The system of claim 1, wherein the amount of CPU utilization is a percentage of CPU utilization.

7. An adaptive session compression management method in an application server, comprising:
acquiring session state information indicated as needing to be saved from a session manager in the application server and buffering the session state information in a session state information buffer component, wherein the session state information is transferred from the session manager to the session state information buffer component through an interface between the session manager and the session state information buffer component;
retrieving configuration information set by a user or system administrator from a configuration file, the configuration information comprising a compression threshold, compressors available at the application server, compression methods as a function of CPU utilization, and compression methods as a function of memory utilization, the compression methods comprising best compression, normal compression, fast compression, and no compression methods;
determining whether the session state information is to be compressed according to a size of the session state information and the configuration information related to the compression thresholds;
determining a one of the compressors and selecting a one of the compression methods according to at least the memory and the CPU of the application server in case that the session state information needs to be compressed, the selecting of the one of the compression methods comprising identifying a first of the compression methods by comparing an amount of the CPU utilization to a first plurality of thresholds corresponding to each the compression methods, identifying a second of the compression methods by comparing an amount of the memory utilization to a second plurality of thresholds corresponding to each the compression methods, and determining the one of the compression methods to be a one of the first and the second compression methods providing a lowest compression performance;
instructing the one of the compressors to compress the session state information according to selected compression method in the case that the selected compression method is not the no compression method; and
storing the session state information at a specified location in the session manager, and in case that the session state information is compressed, storing type information of the determined compressor together with the compressed session state information.

8. The method according to claim 7, wherein said compression thresholds comprise a threshold on the size of session state information.

9. The method according to claim 7, further comprising:
acquiring session state information indicated to be presented to an application from said session manager;
determining whether the acquired session state information has been compressed; and
in case that the acquired session state information has been compressed, decompressing the compressed session state information using a decompressor corresponding to compressor type information stored together with the acquired session state information.

10. The method of claim 7, wherein the first and the second plurality of thresholds are the same.

11. The method of claim 7, wherein the first and the second plurality of thresholds are the different.

12. The method of claim 7, wherein the amount of CPU utilization is a percentage of CPU utilization.

13. An adaptive session management system in an application server, comprising:
a session manager for managing and maintaining session state information of users and applications;
a session state information presentation component for transferring user's session state information between said session manager and an application;
an interface unit, through which a user or a system administrator of the application server sets configuration information in a configuration file; and
an adaptive session compression manager having:
at least one compressor,
a session state information buffer component for buffering session state information from a session manager of the application server when the session state information is indicated as needing to be saved, wherein the session state information is transferred from the session manager to the session state information buffer component through an interface between the session manager and the session state information buffer component, a configuration information acquiring component for acquiring configuration information set by the user or system administrator of the application server from the configuration file, the configuration information comprising a compression threshold, compressors available at the application server, compression methods as a function of CPU utilization, and compression methods as a function of memory utilization, the compression methods comprising best compression, normal compression, fast compression, and no compression methods, a compression determining component for determining whether the session state information in the session state information buffer component needs to be compressed according to a size of the session state information and the configuration information related to the compression threshold, a compression method determining component for determining a one of the compressors and selecting a one of the compressions method according to the conditions of at least the memory and the CPU of the application server in case that the session state information needs to be compressed and for instructing the determined compressor to compress the session state information according to the selected compression method in the case that the selected compression method is not the no compression method wherein the compression method determining component is configured for performing the selecting of the one of the compression methods by identifying a first of the compression methods by comparing an amount of the CPU utilization to a first plurality of thresholds corresponding to each the compression methods, identifying a second of the compression methods by comparing an amount of the memory utilization to a second plurality of thresholds corresponding to each the compression methods, and determining the one of the compression methods to be a one of the first and the second compression methods providing a lowest compression performance.

14. The system of claim 13, wherein the first and the second plurality of thresholds are the same.

15. The system of claim 13, wherein the first and the second plurality of thresholds are the different.

16. The system of claim 13, wherein the amount of CPU utilization is a percentage of CPU utilization.

* * * * *